United States Patent [19]
Engle

[11] Patent Number: 5,839,484
[45] Date of Patent: Nov. 24, 1998

[54] VACUUM TRANSFER SYSTEM AND METHOD FOR FOOD GRADE PRODUCT

[76] Inventor: Marcus J. Engle, 1732 Beltline Rd., Sauk Centre, Minn. 56378

[21] Appl. No.: 632,558

[22] Filed: Apr. 15, 1996

Related U.S. Application Data

[60] Provisional application No. 60/001,846, Aur. 2, 1995.
[51] Int. Cl.$^6$ ..................................... B65B 3/00
[52] U.S. Cl. ................... 141/65; 141/7; 141/59; 141/67; 141/231; 137/205; 119/14.03
[58] Field of Search .................... 141/7, 59, 65, 141/67, 231; 137/205; 119/14.03

[56] References Cited

U.S. PATENT DOCUMENTS

| | | |
|---|---|---|
| Re. 19,537 | 4/1935 | Pierce . |
| 1,535,541 | 4/1925 | Noble ...................................... 137/205 |
| 1,702,897 | 2/1929 | Hartz .................................... 137/205 X |
| 1,846,805 | 2/1932 | Hapgood ............................. 119/14.03 |
| 1,873,314 | 8/1932 | Drake ................................... 137/205 |
| 1,908,684 | 5/1933 | Buchanan . |
| 2,006,393 | 7/1935 | Hapgood ................................. 141/57 |
| 2,037,021 | 4/1936 | Holby ....................................... 222/54 |
| 2,055,531 | 9/1936 | Hapgood ............................. 119/14.03 |
| 2,117,905 | 5/1938 | Nelson . |
| 2,229,793 | 1/1941 | Bradley . |
| 2,421,765 | 6/1947 | Taylor .................................... 222/135 |
| 2,423,879 | 7/1947 | Frees . |
| 2,437,618 | 3/1948 | Schottgen et al. ........................ 222/23 |
| 2,509,214 | 5/1950 | Cordis .................................... 141/59 X |
| 2,863,797 | 12/1958 | Meyer . |
| 3,163,434 | 12/1964 | Krueger . |
| 3,971,400 | 7/1976 | Thompson .............................. 137/205 |
| 4,057,364 | 11/1977 | Bratachitsch ........................ 137/205 X |
| 4,530,370 | 7/1985 | Horky ................................... 134/57 R |
| 4,601,409 | 7/1986 | DiRegolo ............................. 141/65 X |
| 5,265,653 | 11/1993 | Herlth ....................................... 141/65 |
| 5,383,499 | 1/1995 | Mattern ................................. 141/65 X |
| 5,476,154 | 12/1995 | Sage ...................................... 141/67 X |
| 5,492,144 | 2/1996 | Kriewaldt ................................ 137/205 |
| 5,573,045 | 11/1996 | Akazawa ............................... 141/67 X |

*Primary Examiner*—J. Casimer Jacyna
*Attorney, Agent, or Firm*—Patterson & Keough, P.A.

[57] ABSTRACT

A vacuum transfer method and system for transferring liquid food grade product vacuum transfer system for transferring liquid food grade product into and from a vessel. The vessel has at least one product inlet/outlet. The vacuum transfer system includes a selectively activatable vacuum source. A vacuum transfer unit is in fluid communication with the vacuum source and with the vessel. Valves are operably coupled to the vacuum source and the vacuum transfer unit for selectively (a) pressurizing the tank and (b) drawing a vacuum in the tank, whereby drawing a vacuum by the vacuum source in the vessel acts to draw the liquid food grade product into the vessel through the at least one product inlet/outlet and pressurizing the vessel acts to expel the liquid food grade product from the vessel through the at least one product inlet/outlet.

37 Claims, 6 Drawing Sheets

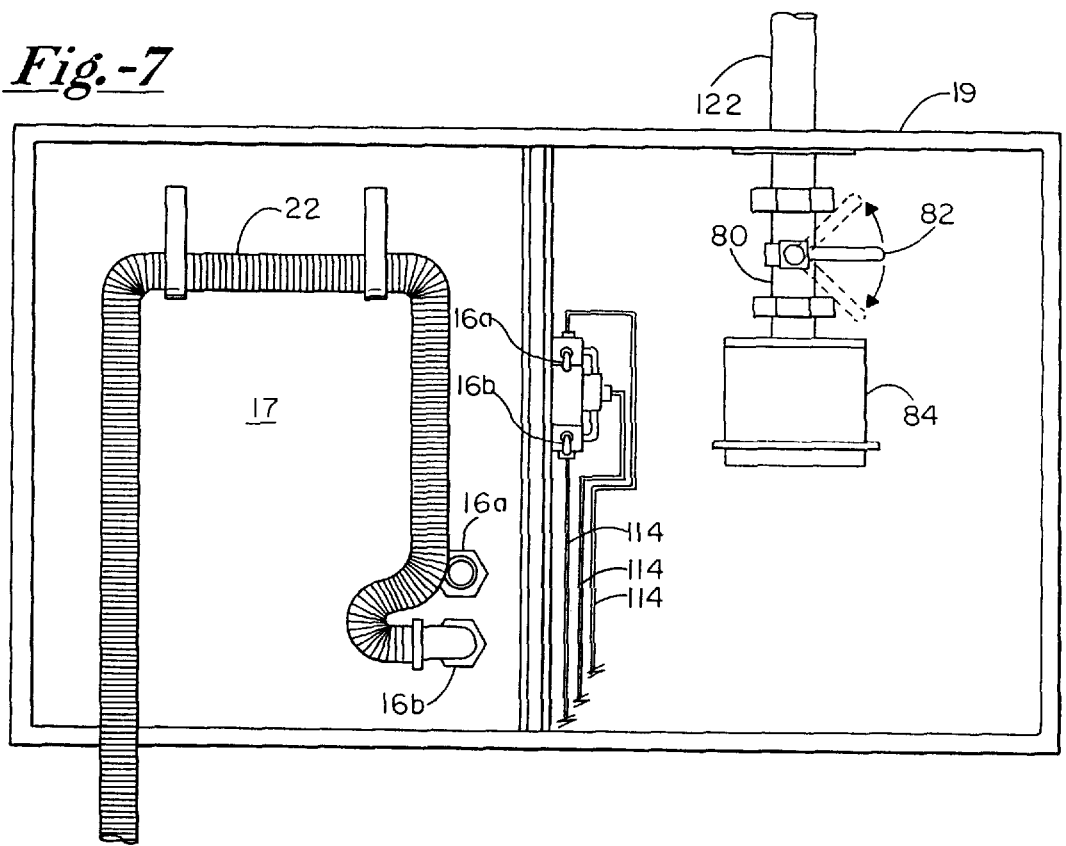

VACUUM TRANSFER SYSTEM AND METHOD FOR FOOD GRADE PRODUCT

CROSS-REFERENCE TO RELATED APPLICATION

This application is based on U.S. Provisional application Ser. No. 60/001,846 to Engle, entitled "Vacuum Transfer System for Food Grade Product", filed Aug. 2, 1995, which is incorporated by reference in its entirety herein.

TECHNICAL FIELD

The present invention relates to the transfer of food grade product in and out of a vessel. More particularly, the transfer is effected by means of vacuum generated in the vessel.

BACKGROUND OF THE PRESENT INVENTION

Food grade product is presently transferred from one vessel to another vessel by means of mechanical pumps that typically have rotating impellers or the like that effect the pumping of the food grade product. Food grade product may include for example eggs, liquid ingredients for the making of ice cream, raw or processed milk, liquid feed for livestock, liquid ingredients for the making of cheese, and the like. Reference herein is with respect to the transfer of raw milk from a holding tank at the production site to a vehicle tank for the transfer of the raw milk to a processing plant. The vehicle may be either a truck or a trailer, as depicted, that is transported by a tractor. Those skilled in the art will recognize that the same principles as are described herein are applicable to other transfers of food grade product from a first vessel to a second vessel. For example, the transfer of raw milk from the truck or trailer-mounted tank to a tank in the processing plant may be effected by the present invention. Additionally, the transfer of food grade product from a first vessel in the processing plant to a second vessel in the processing plant may be effected by the present invention.

Bulk milk pick-up from the point of origin as we know it today, consists of a truck or trailer-mounted stainless steel insulated transport tank. This transport tank is at atmospheric pressure and is therefore not operated at a vacuum and not operated at a pressure greater than atmospheric pressure. In order to effect the transfer of the raw milk form the holding tank to the transport tank, both the holding tank and the transport tank are vented to the atmosphere during the transfer operations.

The amount of time spent transferring the raw milk or other food grade product is a major cost item. With respect to the transport of raw milk, this time dictates the number of drivers and transport trucks needed to service a specified route of customers. The size of dairies has been ever increasing and the distance between dairies on a route is also increasing. Dairy herds of more than two hundred animals are not considered big any more. This increase in size has required that the size of the holding tanks at the dairy be greatly increased. In the past, a five hundred gallon holding tank was considered adequate. The holding tank now may hold several thousand gallons of raw milk. The sheer size of the holding tanks has greatly increased the transfer times. During the transfer of the milk from the holding tank to the transport tank both the driver and the truck are idle, greatly increasing the cost of transporting the milk from the dairy top the processing plant.

The milk is presently pumped from the holding tank at the farm (or other site of pick-up) to the transport tank by several different types of mechanical food grade impeller pumps. Presently, the pump that will pump the greatest volume of milk is a hydraulic driven stainless steel gear pump that will pump 230 gallons per minute. The cost of this unit is approximately $15,000.00 installed. To transfer two thousand gallons of milk product using this pump takes in excess of eight minutes.

The problem to the purchaser of the aforementioned pump, aside from the cost, is a problem that is years old. Every time milk is forced through pump impellers, the bacteria count in the milk is multiplied, and the molecular structure of the raw milk product is broken down. The more agitation that is caused by the pump, the greater the increase in the bacteria level and the greater the molecular breakdown that results in the milk. The increase in the bacteria level can pose serious health concern. Additionally, the membrane around the fat molecule is broken by the pump agitation, resulting in undesired acidity in the milk. The molecular breakdown results in a decrease in the amount of the milk that can be used as an ingredient in dairy products, such as ice cream and cheese. The non useable portion is disposed of as the whey that is a by product of making the dairy products and is useful primarily for animal feed. The animal feed is sold substantially reduced cost as compared products for human consumption that could otherwise have been produced, thereby reducing the potential return form a quantity of raw milk.

An additional health concern is the cleanliness of the pump used for the transfer of the food grade product from vessel to vessel. Recently, an incident of salmonella infection being passed on to the ultimate consumer as a result of the lack of cleanliness of the transport vessel has been reported. It is a requirement that the transfer pumps be disassembled at least daily and sanitized to preclude such a problem from occurring. Sanitizing the impellers of the pump is a difficult task. Only a small amount of the salmonella organism left in the impeller can taint a subsequent load of food grade product that is pumped into the vessel.

With the increased size of dairy holding tanks comes the need to increase the volume load of the transport tanks that are mounted on a single truck chassis. Many states have stringent regulations governing the gross weight of vehicles using the public roads. With the increased transport tank volume and the weight of milk product that is being transported, there is a need to keep the transport tank weight to a minimum in order to maximize the milk volume that may be legally transported.

It would be a decided advantage in the food products industry to be able to more rapidly transfer food grade product from one vessel to another and at the same time minimize the mechanical agitation of the food grade product that results from such transfer to minimize the bacteria count increase in the food grade product and to minimize the molecular structure breakdown that also results form the mechanical agitation. Further, it would be an advantage to have a transfer system for food grade product that was more easily sanitized.

SUMMARY OF THE INVENTION

Using the vacuum system of the present invention for transferring raw milk, the milk flows at a rate in excess of 2,000 gallons per minute through a six inch diameter conduit while transferring milk from the holding tank and loading the transport tank, thereby reducing the loading time at the pick-up point by a factor of almost ten as compared to the fastest current means. This is accomplished using existing piping from the holding tank to the transport tank. Such piping is typically either two and a half inch pipe or three inch pipe. Coupled with the faster transfer time are a better load environment for the raw product, a significant lowering the initial costs of the pumping system, and a reduction in clean-up and re-sanitizing time of the system as the raw product never touches any pumping mechanism, but is transferred solely through piping. No additional pump is necessary to effect the transfer of the food grade product. Additionally, from a health standpoint, there is no deleterious agitation of the food grade product heretofore associated with pumping by means of high speed impeller rotation.

The present invention is a vacuum transfer system for transferring liquid food grade product into and from a vessel. The vessel has at least one product inlet/outlet. The vacuum transfer system includes a selectively activatable vacuum source. A vacuum transfer unit is in fluid communication with the vacuum source and with the vessel. Valving means are operably coupled to the vacuum source and the vacuum transfer unit for selectively (a) pressurizing the tank and (b) drawing a vacuum in the tank, whereby drawing a vacuum by the vacuum source in the vessel acts to draw the liquid food grade product into the vessel through the at least one product inlet/outlet and pressurizing the vessel acts to expel the liquid food grade product from the vessel through the at least one product inlet/outlet.

BRIEF DESCRIPTION OF THE DRAWINGS

FIG. 7 is an elevational view of the interior of the rear compartment of the tank vehicle.

DETAILED DESCRIPTION OF THE DRAWINGS

Figure 1:
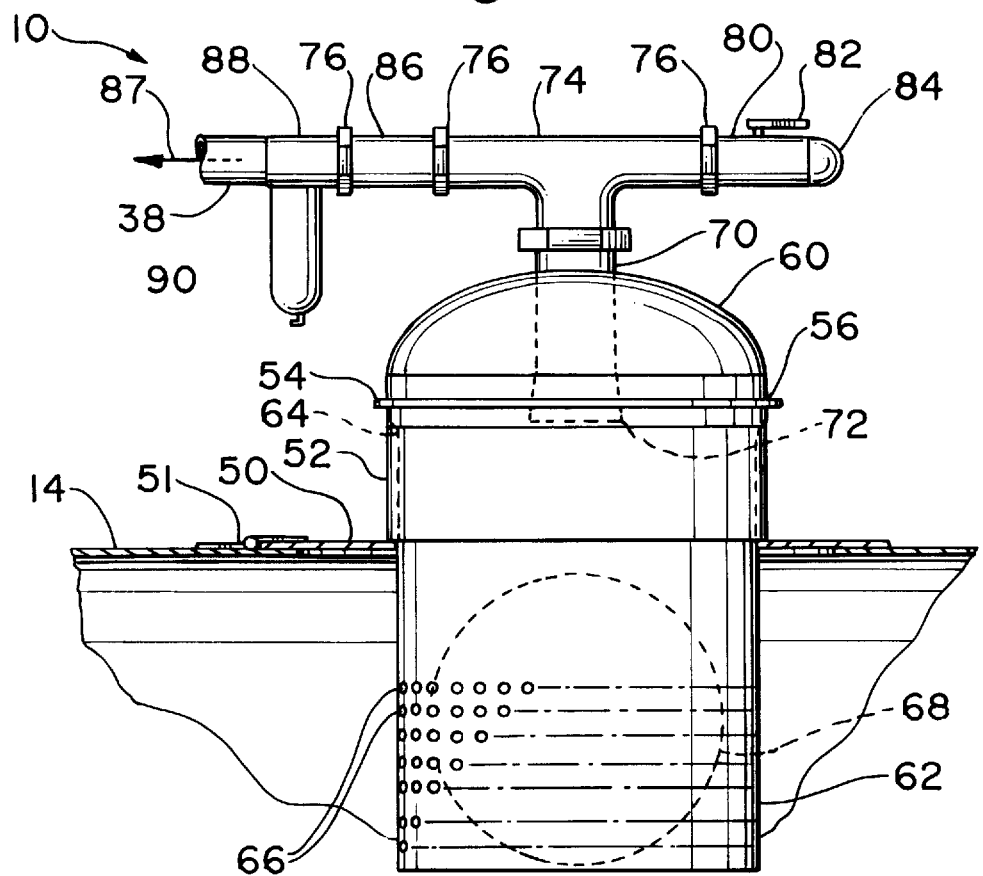
FIG. 1 is a sectional side view of the vacuum transfer unit of the present invention as taken along lines 1—1 of FIG. 2.
Figure 2:
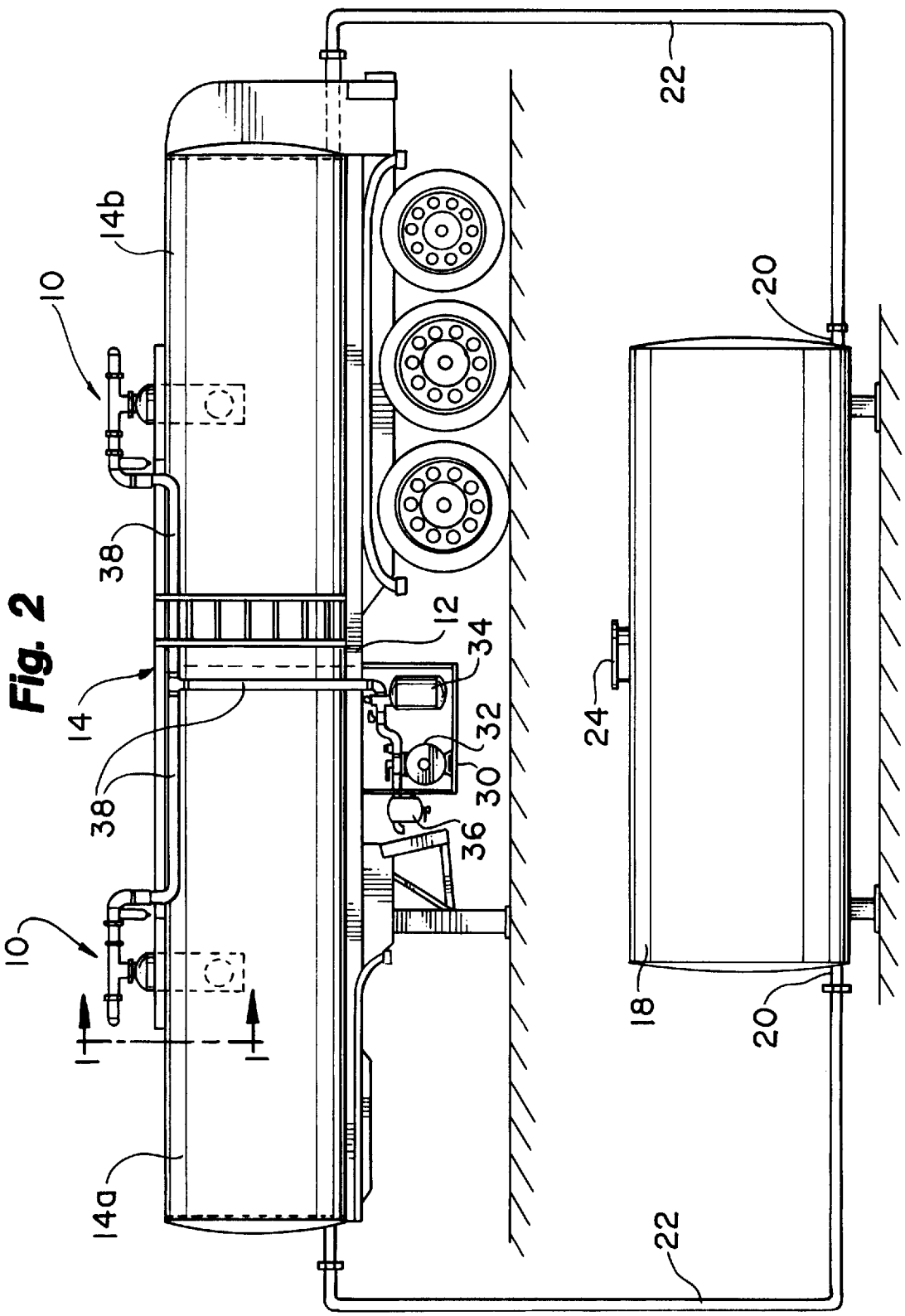
FIG. 2 is a side view of a vehicle with tandem transport tanks mounted thereon and a primary shutoff unit mounted in each of the transport tanks.

The vacuum transfer unit of a first embodiment of the present invention is shown generally at 10 in FIGS. 1 and 2. A tank vehicle 12 has a unitary transport tank 14 mounted thereon. In the depiction of FIG. 2, the transport tank 14 is divided into two separate tanks 14a, 14b. A single tank 14 configuration could be used as well. Although the present invention is described with respect to a transport tank, the vacuum transfer unit 10 is useful for effecting transfer into and from any vessel.

The transport tank 14 is preferably constructed of 10 gauge stainless steel, (the same material and thickness as some non-vacuum tanks of today) and is reinforced with stainless steel hat channel rings and deep dish heads to keep the tank 14 from implosion during periods of high vacuum in the tank 14. The cross section of the hat channels is substantially similar to the cross section of a hat having a crown and circular brim. Insulation is placed between the channels and a preferably stainless steel outer shell is affixed to the outer margin of the channels.

Each transport tank 14a, 14b has a product inlet/outlet 16a, 16b associated therewith. The product inlet/outlet 16a, 16b is typically disposed at a low point in the transport tank 14a, 14b so that the transport tank 14a, 14b is filled from the bottom thereof and emptied from the bottom thereof. As depicted, a holding tank 18 is positioned adjacent to the tank vehicle 12. The holding tank 18 has two outlets 20. Each such outlet 20 is fluidly coupled to one of the product inlet/outlets 16a, 16b by a flexible conduit 22. The flexible conduit 22 is typically stored on the tank vehicle 12 and connected to the holding tank 18 at the product pickup site. The flexible conduit 22 may have a diameter between two and a half inches and six inches. The holding tank 18 has a inlet/vent 24 through which food product is transferred into the holding tank 18 and by which means the holding tank 18 is vented during removal of food product therefrom.

A vacuum generation unit 30 is mounted on the tank vehicle 12. The vacuum generation unit 30 may be power take off (PTO) driven from the tractor (not shown) that is utilized to pull the tank vehicle 12. The vacuum generation unit 30 is comprised of a pump 32, a filter 34, a lubricant trap 36, and vacuum lines 38. The pump 32 is preferably a vane type pump. The filter 34 isolates the pump 32 from any foreign material, including product, that may be passing through the vacuum lines 38. A lubricant is typically injected into the pump to lubricate the interfaces between the vanes (not shown) and the inner surface (not shown) of the pump case of pump 32. The lubricant trap 36 is downstream of the pump 32 and is utilized to entrain lubricant that is carried with the exhaust from the pump 32. The lubricant so entrained may be then recycled back to the pump 32 to further lubricate the vanes thereof.

Referring to FIG. 1, a manway cover 50 is hinged at one side 51 and sealed at the perimeter thereof to the outer surface of the tank 14. The manway cover 50 is generally circular and is contoured to conform to the surface of the outer shell of the tank 14. The manway cover is preferably constructed of stainless steel.

A manway opening 52 is centrally disposed in the manway cover 50. The manway opening 52 is preferably cylindrical in shape, having a lower margin that is shaped to conform to the contour of the manway cover 50. The upper margin of the manway opening 52 has a sealing lip 54 defined thereon. The manway opening 52 is preferably a circular opening having a diameter of approximately two feet to make it possible for a person to enter the tank 14 through the manway opening 52, if needed.

The vacuum transfer unit 10 is depicted as being inserted from the top within the manway opening 52. The vacuum transfer unit 10 is sealingly retained within the manway opening 52 by quick release clamp 56 affixed to the sealing lip 54. The quick release clamp 56 is preferably a circular ring that encloses the sealing lip 54 and is held in sealing engagement therewith by an over center lock (not shown). The vacuum transfer unit 10 may be readily removed from the manway opening 52 in order to perform required cleaning and sanitizing by releasing the quick release clamp 56 and pulling the vacuum transfer unit 10 upward, clear of the manway opening 52.

Vacuum transfer unit 10 is fully constructed of stainless steel material in order to meet the requirements for storing and transferring food grade product.

Vacuum transfer unit 10 has a low profile vacuum transfer dome 60 that forms the upper surface thereof. A float ball cage 62 depends from the vacuum transfer dome 60 and is attached thereto by float ball cage fastening clips 64. The float ball cage 62 has a plurality of apertures 66 defined therein that permit the free flow of food product in and out of the float ball cage 62, while retaining the stainless steel float ball 68 therein. The float ball 68 is generally spherical in shape and is sealed having a quantity of air trapped therein, such that the float ball 68 will float on top of the liquid food grade product that rises into the float ball cage 62. When there is no liquid food grade product in the float ball cage 62, the float ball 68 drops to the bottom of the float ball cage 62 and rests there.

A primary pipe 70 is disposed within the vacuum transfer dome 60 and provides a fluid passageway through vacuum transfer dome 60 from the float ball cage 62. The lower margin of the primary pipe 70 has a generally circular beveled rubber float seal seat 72 disposed thereon. The float seal seat 72 is beveled inward, such that the lower most diameter of the beveled portion is greater than the uppermost, inner diameter of the beveled portion, as depicted in FIG. 1. The lowermost diameter of the float seal seat 72 is less than the diameter of the float ball 68. The float seal seat 72 is designed to establish a fluidly sealing engagement with the outer surface of the float ball 68 when the float ball 68 has risen into the float seal seat 72 and is centered thereon. The upper margin of the primary pipe 70 is coupled to a stainless steel tee 74 by a stainless steel nut 76.

A first outlet of tee 74 is coupled to a manually operated butterfly valve 80 by a stainless steel nut 76. An external handle 82 is provided on the butterfly valve 80 to manually open and close the butterfly valve 80 as desired. A removable, disposable intake air filter 84 is attached to the butterfly valve 80. The butterfly valve 80 connects the interior of the tank 14 with the outside atmosphere when the butterfly valve 80 is in the open configuration. The butterfly valve 80 could be replaced with another type of U.S.D.A. approved valve, such as a ball type or plug type valve.

The second branch of the tee 74 is coupled by a stainless steel nut 76 to a one way check valve 86. The check valve 86 is biased in the closed configuration so that no fluid flow is possible through the check valve 86. When in the open configuration, the check valve 86 permits the flow of fluid only from right to left as depicted by arrow 87 in FIG. 1. In order to open check valve 86, a vacuum of less than ten inches of mercury, but preferably three to five inches of mercury must be applied at the left side of check valve 86, as depicted in FIG. 1. The necessary vacuum to open the check valve 86 is applied to the left side of the check valve 86 by the vacuum generation unit 30 when the vacuum generation unit 30 is in operation. In all cases when the vacuum generation unit 30 is not in operation, the check valve 86 is biased in the closed configuration, isolating the vacuum line 38 from the tank 14.

Check valve 86 is fluidly coupled by a stainless steel nut 76 to a backup butterfly valve 88. Butterfly valve 88 is coupled to actuator 90. Actuator 90 may be either electrically or pneumatically actuated. Actuation of actuator 90 is preferably synchronized with the activation of the vacuum generation unit 30, such that the butterfly valve 88 is open when the vacuum generation unit 30 is operating and the butterfly valve 88 is closed when the vacuum generation unit 30 is not operating. The butterfly valve 88 is fluidly coupled to vacuum line 38 and thereby to the vacuum generation unit 30.

Upon activation, the vacuum generation unit 30 draws a vacuum in the vacuum lines 38. Such vacuum may selectively affect either or both of the vacuum transfer units 10, as depicted in FIG. 2, depending on the configuration of the aforementioned valves of the two vacuum transfer units 10.

The vacuum transfer unit of a second embodiment of the present invention is shown generally at 10 in FIGS. 3–7. Similar numerals depict similar components in the description of the second embodiment as in the description of the first embodiment of the vacuum transfer unit 10.

A tank vehicle 12 has a unitary transport tank 14 mounted thereon. To facilitate the maintenance and cleaning of the vacuum transfer unit 10 and the tank 14, a ladder 11 and a gangway 13 are provided to afford access thereto by an operator as needed. In the depiction of FIG. 2, the transport tank 14 is divided into two separate tanks 14a, 14b by a wall 15. A single tank 14 configuration could be used as well. Each transport tank 14a, 14b has a product inlet/outlet 16a, 16b disposed on the front wall 17 of the rear compartment 19 of the tank vehicle 12, as depicted in FIG. 7. A flexible conduit 22 is stored in the rear compartment 19 for connecting to the holding tank 18.

Figure 3:
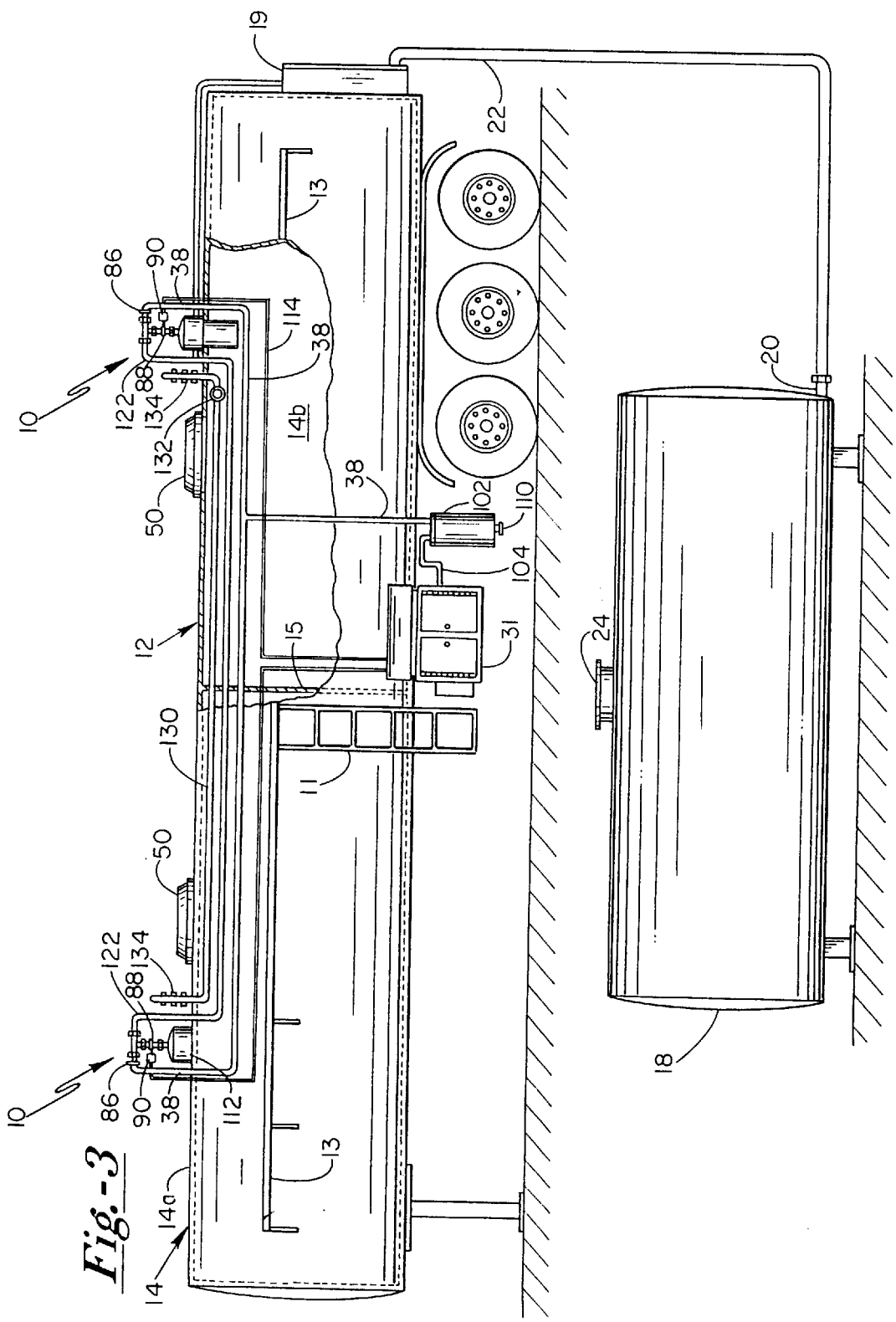
FIG. 3 is a side view of a tank vehicle with tandem transport tanks mounted thereon and a second embodiment of the vacuum transfer unit of the present invention mounted in each of the transport tanks with a portion of one tank broken away to reveal the vacuum unit mounted therein.

Referring to FIG. 3, a manway cover 50 is fluidly coupled to each tank 14a, 14b. Each manway cover 50 is hinged at one side and sealed at the perimeter thereof to the outer surface of the tank 14. The manway cover 50 is generally circular and is contoured to conform to the surface of the outer shell of the tank 14. The manway cover 50 is preferably constructed of stainless steel and is designed to accommodate access to the tank 14 by an operator, primarily to clean the inside of the tank 14.

A vacuum generation unit 30 is mounted on the tank vehicle 12 in a cabinet 31. The vacuum generation unit 30 is self contained, in that it contains its own power generation capability and the vacuum generation unit 30 may be configured to either load product into the tank 14 or unload product from the tank 14. This capability ensures that there is an on board capability to load and unload using the components of the present invention, without resort to an external source of power for either loading or unloading the tanks 14a, 14b. This is an important feature so that the tanks 14a, 14b can be loaded or unloaded at any facility without the need for specialized pumping capability at the facility adapted to be compatible with the vacuum transfer unit 10.

The vacuum generation unit 30 is comprised of a pump 32, a motor 100, a secondary shutoff 102, and vacuum lines 38. The pump 32 is preferably a lobe type blower or a rotary vane type air compressor. The pump 32 is powered by a rotary drive shaft 103 coupled to the motor 100. The pump 32 has an air line 104 that fluidly couples the pump 32 to the secondary shutoff 102. A four way change over valve 106 is disposed between the air line 104 and the pump 32 and is mounted on the pump 32. The four way change over valve 106 is utilized to selectively alter the fluid coupling from the pump 32 to the air line 104 such that a vacuum is drawn through the air line 104 or a fluid, preferably air, is forced under pressure through the air line 104. The configuration of the four way change over valve 106 is selectable by an operator utilizing a two position valve handle (not shown). By this means, the pump 32 is used to either draw a negative pressure in the vacuum line 38 or to charge the vacuum line 38 under a positive pressure. Valves.

The motor 100 is preferably a gas internal combustion engine of approximately eighteen bhp. The motor 100 preferably has a battery and electric start capability that is selectable on an operator's panel 108. The operator's panel 108 also has a throttle for control of the output of the motor 100 as desired. The motor 100 is designed to operate at an idle rpm. When at idle rpm, the motor 100 is disengaged from the pump 32. The throttle can then be advanced to a greater rpm that activates a clutch engagement to the pump 32 and causes rotational driving of the pump 32 by the motor 100.

The secondary shutoff 102 is a vessel that functions as a shutoff to isolate the pump 32 from any liquid that might be drawn from the secondary shutoff 102 through the air line 104. The primary shutoff function is accomplished with the vacuum transfer unit 10. Accordingly, the secondary shutoff 102 has a float valve (not shown) disposed in the secondary shutoff 102 that is interposed between the vacuum line 38 and the air line 104 such that, when the liquid in the secondary shutoff 102 rises to a certain level in the secondary shutoff 102, the float valve engages a seat and the flow of fluid to the pump 32 is interrupted. This prevents liquid from entering the pump 32, which could result in damage to the pump 32. A drain is disposed in the bottom of the secondary shutoff 102 to remove accumulated liquid. The secondary shutoff 102 has a valved drain 110 disposed in the bottom for the draining of liquid therefrom as desired.

Figure 4:
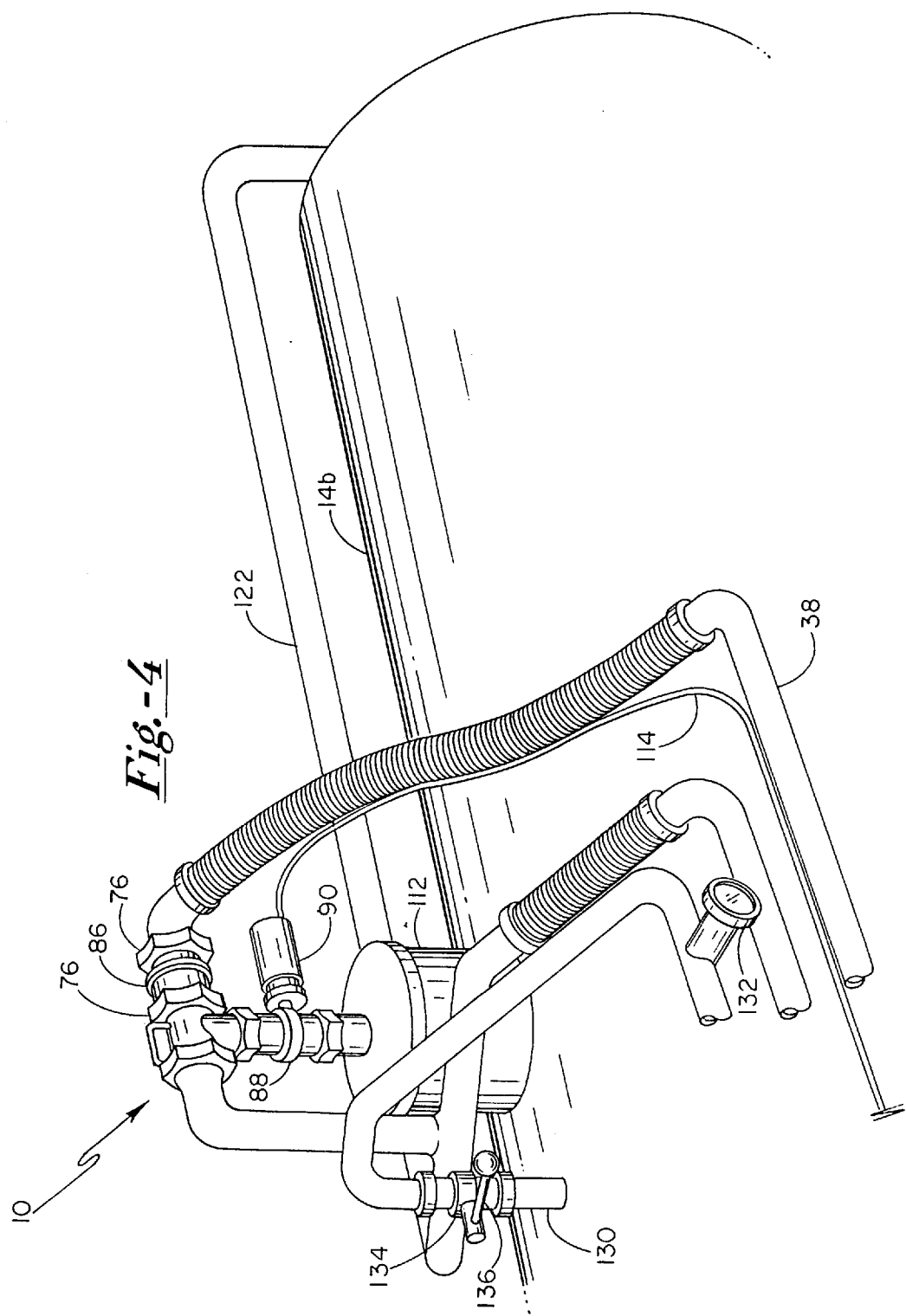
FIG. 4 is perspective view of the plumbing and valving of the rearmost vacuum transfer unit as depicted in FIG. 3.
Figure 5:
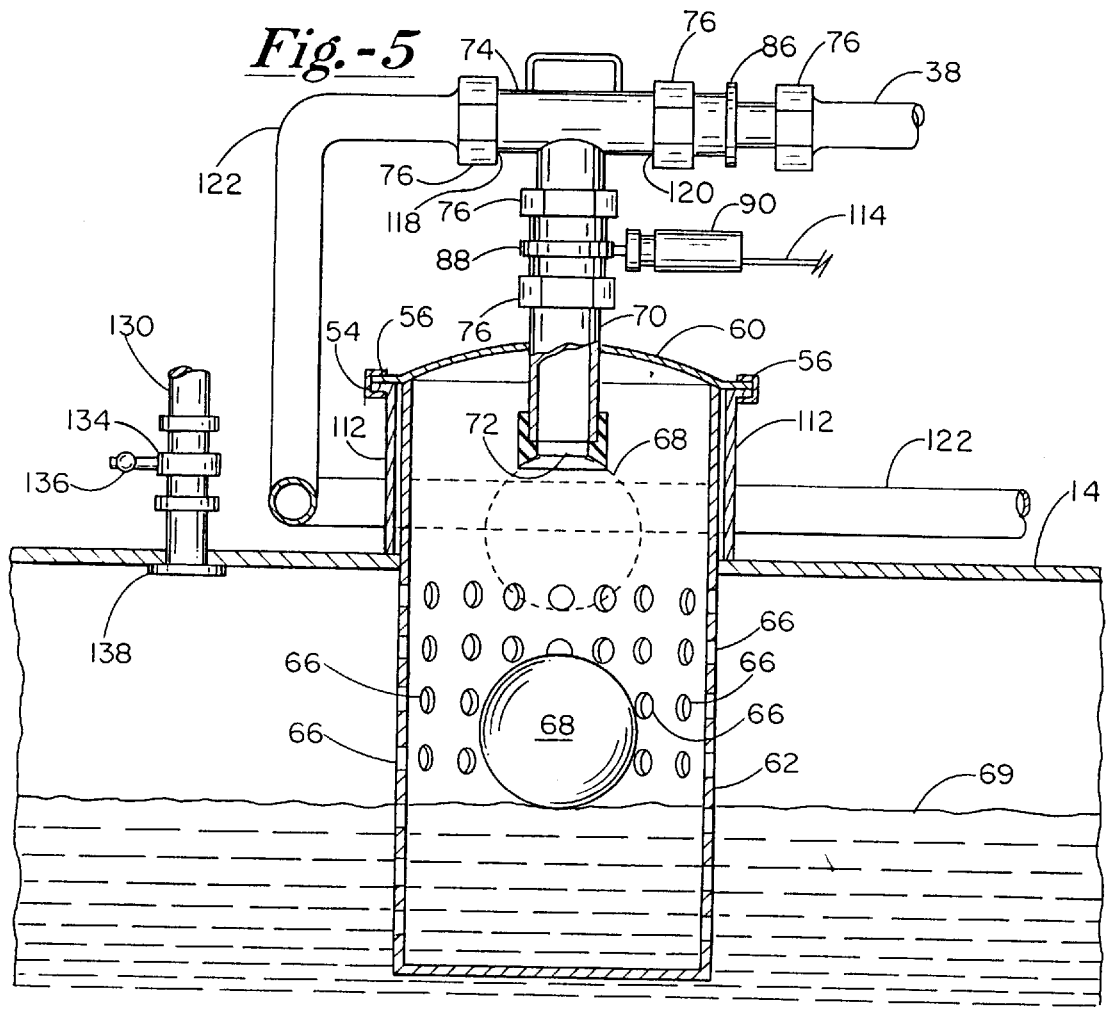
FIG. 5 is an elevational view of the vacuum transfer unit with portions thereof broken away.
Figure 6:
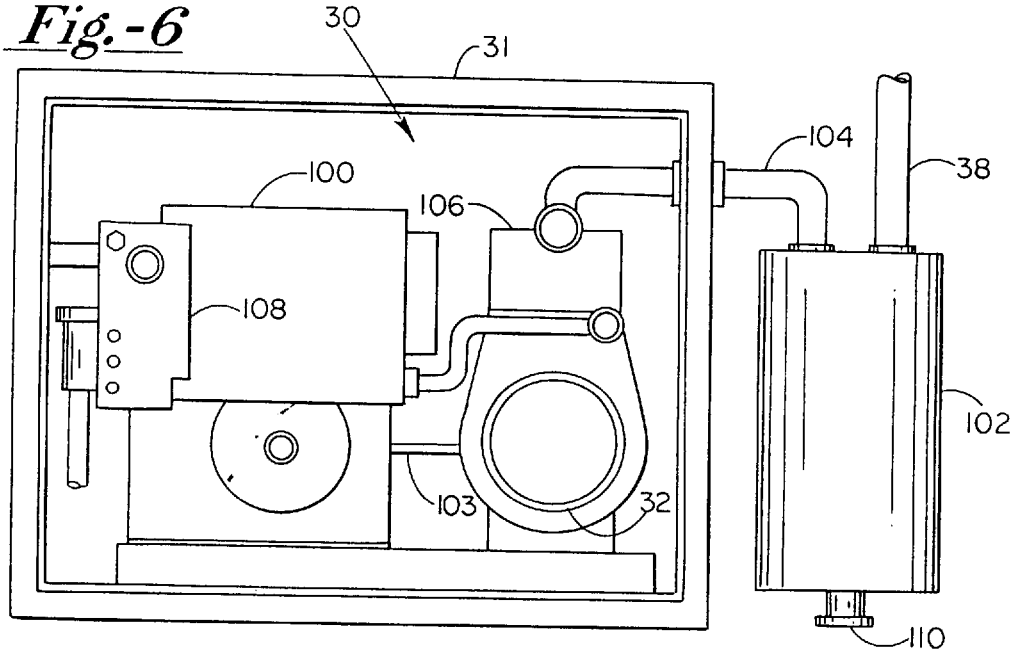
FIG. 6 is an elevational view of the vacuum generation unit mounted on the tank vehicle.

Referring to FIGS. 3–5, the vacuum transfer unit 10 is depicted as being inserted from the top within a collar 112. The collar 112 is affixed to the tank 14 as by welding. The vacuum transfer unit 10 is sealingly retained within the collar 112 by quick release clamp 56 removably affixed thereto. The quick release clamp 56 is preferably a circular ring that encloses a lip 54 that forms the upper margin of the collar 112 and is held in sealing engagement therewith by an over center lock (not shown). The vacuum transfer unit 10 may be readily removed from the manway opening 52 in order to perform required cleaning and sanitizing by releasing the quick release clamp 56 and pulling the vacuum transfer unit 10 upward, clear of the collar 112.

The vacuum transfer unit 10 has a low profile vacuum transfer dome 60 that forms the upper surface thereof. A float ball cage 62 depends from the vacuum transfer dome 60. The float ball cage 62 has a plurality of apertures 66 defined therein that permit the free flow of food product in and out of the float ball cage 62, while retaining the stainless steel float ball 68 therein.

A primary pipe 70 is disposed within the vacuum transfer dome 60 and provides a fluid passageway through vacuum transfer dome 60 from the float ball cage 62. The lower margin of the primary pipe 70 has a generally circular beveled rubber float seal seat 72 disposed thereon.

The upper margin of the primary pipe 70 is coupled by a stainless steel nut 76 to a butterfly valve 88. The butterfly valve 88 is coupled to actuator 90. Actuator 90 may be either electrically or pneumatically actuated and acts to open and close the butterfly valve 88. Actuation of actuator 90 is preferably synchronized with the activation of the vacuum generation unit 30 and is controlled by means of communication lines 114 by manually operated switches 116a, 116b, with the switch 116a being coupled to the actuator 90 on the vacuum transfer unit 10 in the tank 14a and the switch 116b being coupled to the actuator 90 on the vacuum transfer unit 10 in the tank 14b. The communication lines 114 are preferably either electric or pneumatic. The butterfly valve 88 coupled to the tee 74 by a nut 76.

The tee 74 has a vent outlet 118 and a vacuum outlet 120. The vent outlet 118 is connected to the vent line 122 by a nut 76. The vent line 122 is coupled to a manually operated butterfly valve 80, as depicted in FIG. 7. An external handle 82 is provided on the butterfly valve 80 to manually open and close the butterfly valve 80 as desired. The butterfly valve 80 is connected to a removable, disposable intake air filter 84 that is located in the rear compartment 19. The butterfly valve 80 connects the interior of the tank 14 with the outside atmosphere when the butterfly valve 80 is in the open configuration.

The second branch of the tee 74 is coupled by a stainless steel nut 76 to a check valve 86. The check valve 86 is biased in the closed configuration so that no fluid flow is possible through the check valve 86. When in the open configuration, the check valve 86 permits the flow of fluid only from right to left as depicted by arrow 87 in FIG. 1. In order to open check valve 86, a vacuum of less than ten inches of mercury, but preferably three to five inches of mercury must be applied at the left side of check valve 86. The necessary vacuum to open the check valve 86 is applied to the left side of the check valve 86 by the vacuum generation unit 30 when the vacuum generation unit 30 is in operation.

Cleaning lines 130 are fixedly coupled to the tank 14. An inlet 132 is depicted in FIG. 4. The inlet 132 provides a coupling to an exterior source of cleaning solution that may be introduced under pressure to the tank 14. A valve 136 that is manually operated by handle 136 is disposed in the cleaning lines 130 so that the cleaning solution may be introduced to either or both of the tanks 14a, 14b, as desired. A nozzle 138 is disposed within the tank 14 for dispensing the cleaning solution.

Upon activation, the vacuum generation unit 30 draws a vacuum in the vacuum lines 38. Such vacuum may selectively affect either or both of the vacuum transfer units 10 as depicted in FIGS. 2 and 3 by selectively configuring appropriate valves in the vacuum lines 38.

There are essentially three operating conditions for the present invention. Referring to the embodiment of FIGS. 1 and 2, the first such operating condition is transferring food product from the holding tank 18 into the transport tank 14a, 14b. To effect such transfer by means of vacuum, (a) the tank into which the food grade product is to be transferred, transport tank 14a, 14b in the present example, must be isolated from the atmosphere, (b) the two tanks must be fluidly connected, as by conduit 22 in the present example, and (c) the tank being transferred from, here holding tank 18, must be vented to the atmosphere as at inlet/vent 24. This creates a fluid flow path from the vacuum generation unit 30 through the tanks 14a, 14b, and holding tank 18 to the atmosphere at inlet/vent 24 with the food grade product disposed between the source of the vacuum and the atmosphere. Generation of the vacuum by vacuum generation unit 30 will draw the food grade product toward the source of the vacuum and displace the food grade product in the holding tank 18 with air drawn in through the inlet/vent 24.

In order to establish the requisite fluid flow path as indicated above to effect such transfer, the vacuum transfer unit 10 is configured with the manually operated butterfly valve 80 maintained in its closed position. This isolates the tank 14 from the atmosphere. The vacuum generation unit 30 is activated and at the same time a signal is sent to valve actuator 90 to open the butterfly valve 88. When the butterfly valve 88 is in the open configuration, the check valve 86 is in flow communication with the vacuum generation unit 30 and vacuum generated by the vacuum generation unit 30 acts upon the check valve 88. At such time as the vacuum generation unit 30 applies a three to five inch of mercury vacuum to the check valve 86, check valve 86 opens.

With respect to the embodiment of FIGS. 3–7, the manually operated butterfly valve 80, which is located in the rear compartment 19, is maintained in its closed position. The appropriate switch 116a, 116b, also located in the rear compartment 19, is selected to actuate valve actuator 90 to open the butterfly valve 88 for the desired tank 14a or 14b. Prior to energizing the pump 32, the four way change over valve 106 must be in the position such that the pump 32 is drawing a vacuum in the vacuum lines 38.

At this point a vacuum is drawn in the transport tank 14a, 14b. The vacuum is approximately 22–25 inches Hg. The vacuum is transmitted to the transport tank 14a, 14b via primary pipe 70 and the plurality of apertures 66 defined in the float ball cage 62. The vacuum does not affect the float ball 68 and the float ball 68 remains disposed on the bottom of the float ball cage 62.

As the air in the transport tank 14a, 14b is substantially exhausted by the vacuum generation unit 30, the vacuum acts through the conduit 22 on the food grade product that is stored in the holding tank 18. This vacuum draws the food product from the holding tank 18 through the flexible conduit 22 and into the transport tank 14a, 14b at a very high rate of flow without the agitation caused by a pump impeller. As the food grade product is drawn from the holding tank 18, air is drawn into the holding tank 18 through the open inlet/vent 24.

The holding tank 18 may have a lesser capacity than the tank 14. In this instance, the holding tank 18 will be emptied prior to fully filling the transport tank 14a, 14b. The operator then observes the emptying of the holding tank 18 and shuts off the vacuum generation unit 30. At the same time as deactivation of the vacuum generation unit 30, a signal is sent to the valve actuator 90 closing the butterfly valve 88. Additionally, removal of the vacuum from left side of the check valve 86 that is the result of deactivating the vacuum generation unit 30 causes the check valve 86 to close, sealing the vacuum transfer unit 10.

In the instance in which the food grade product that is transferred to the transport tank 14a, 14b causes he transport tank 14a, 14b to become filled prior to completely transferring the food grade product from the holding tank 18, the stainless steel float ball 68 rises as the food grade product flows into the float ball cage 62 and sealingly engages the float seat 72. In such condition, the vacuum generation unit 30 is incapable of applying a vacuum to the transport tank 14a, 14b. The operator then deactivates the vacuum generation unit 30. The butterfly valve 88 and check valve 86 are then closed as previously indicated.

The second operating condition is in transport of food product. In this condition, the manually operated butterfly valve 80 is maintained in its closed position. The check valve 86 is closed due to the fact that no vacuum is being applied thereto by the vacuum generation unit 30. If the transport tank 14a, 14b is overly full, the float ball 68 will also in contact with the float seat 72, preventing the surge of foam or food grade product into the primary shut off unit 10. In practice, it is rare that the transport tank 14a, 14b will be so full as to cause this condition and the float ball 68 is then floating free of float seat 72.

The third operating condition is emptying the transport tank 14a, 14b. In this operating condition, as depicted in the embodiment of FIGS. 1 and 2, the operator must ascend to the top of the tank 14a, 14b and manually open the butterfly valve 80 by actuation of the handle 81 to vent the transport tank 14a, 14b. This same action is accomplished in the rear compartment 19 in the embodiment of FIGS. 3–7. The check valve 86 and butterfly valve 88 are maintained in their closed positions. A conduit similar to conduit 22 is connected to the product inlet/outlet 16a, 16b and pumps in the plant that is receiving the food product are activated to empty the transport tank 14a, 14b. The plant may also be equipped with a vacuum transfer apparatus in accordance with the present invention. In such case, a vacuum generation unit similar to vacuum generation unit 30 and a vacuum transfer unit 10 are operably coupled to a receiving tank within the processing plant and removal of the food grade product from the transport tank 14a, 14b is accomplished in a manner similar to the manner described above for transferring the food grade product from the holding tank 18 to the transport tank 14a, 14b.

With respect to the embodiment of FIGS. 3–7, The tanks 14a, 14b may be emptied by utilizing the vacuum generation unit 30. In this case, the four way change over valve 106 must be in the position such that the pump 32 is pressurizing the vacuum lines 38. The preferred vacuum generation unit 30 is capable of imposing a pressure of approximately ten lb/sq in on the product in the tank 14a, 14b. This pressure is conveyed by means of vacuum lines 38 through the vacuum transfer unit 10. The pressure forces the product out of the product inlet/outlet 16a, 16b. Alternatively, in the instance where the plant to which the product is being transferred has a pressurization capability, the plant pressurization unit may be connected to the vent line 122 to pressurize the product in the tank 14. This is accomplished by removing the filter 84 and connecting a conduit from the plant pressurization unit to the butterfly valve 80. The butterfly valve 80 is then opened. The butterfly valve 88 must also be opened by activating the actuator 90 by means of the switch 116a, 116b. In this configuration, the one way check valve 86 prevents the pressure from pressurizing the vacuum lines 38.

Various changes and modifications may be made without departing from the spirit of the invention, and all such changes and modifications are contemplated as may come within the scope of the claims.

We claim:

1. A method for transferring a liquid food grade product between a first vessel to a second vessel by means of vacuum, the second vessel having a submersible liquid inlet/outlet and an air inlet/outlet, comprising the steps of:
   (1) when filling the second vessel;
      (a) providing a fluid coupling from the first vessel to the second vessel liquid inlet/outlet;
      (b) venting the first vessel to a fluid source;
      (c) fluidly unsealing the second vessel at the second vessel liquid inlet/outlet;
      (d) drawing a vacuum in the second vessel by means of activation of a vacuum source operably coupled to the second vessel air inlet/outlet and through the fluid coupling, thereby drawing a vacuum in the first vessel;
      (e) providing a first vacuum operated check valve means disposed between the vacuum source and the second vessel; and
      (f) providing a second valve means disposed between the vacuum source and the second vessel;
      (g) fluidly sealing the second vessel liquid inlet/outlet when a selected volume of food grade product has been transferred to the second vessel;
      (h) removing the vacuum from the second vessel after fluidly sealing the second vessel liquid inlet/outlet; whereby the food grade product is drawn from the first vessel through the fluid coupling and thence through the second vessel submersible liquid inlet/outlet into the second vessel, the food grade product in the first vessel being displaced by fluid from the fluid source the first vacuum operated check valve means and the second valve means acting to isolate the liquid food grade product from the vacuum source.

2. A method for transferring a liquid food grade product from a first vessel to a second vessel as claimed in claim 1 wherein the second valve means disposed between the vacuum source and the second vessel is a solenoid valve, the solenoid valve being biased in the closed configuration, said bias being overcome by an electrical input thereto.

3. A method for transferring a liquid food grade product from a first vessel to a second vessel as claimed in claim 1 wherein the second valve means disposed between the vacuum source and the second vessel is a float valve, the float valve closing responsive to the food grade product in the second vessel rising to a selected level.

4. A vacuum transfer system for transferring liquid food grade product into and from a vessel by means of a vacuum drawn in the vessel by a selectively activatable vacuum source, the vessel having at least one submersible product inlet/outlet comprising:

a vacuum transfer unit being in fluid communication with the vacuum source and with the vessel, having valving means operably coupled to the vacuum source and the vacuum transfer unit for selectively (a) pressurizing the tank under a positive pressure and (b) drawing a vacuum in the tank, said valving means positively isolating the vacuum source from the vessel when the vacuum source is deactivated such that the liquid food grade product is not accessible to the vacuum source, the vacuum transfer unit being disposed in an aperture defined in a wall of the vessel;

whereby drawing a vacuum by the vacuum source in the vessel acts to draw the liquid food grade product into the vessel through the at least one submersible product inlet/outlet and pressurizing the vessel acts to expel the liquid food grade product from the vessel through the at least one submersible product inlet/outlet.

5. A vacuum transfer system for transferring liquid food grade product as claimed in claim 4 further including the vacuum transfer unit having a check valve for selectively interrupting the flow communication with the vacuum source, the vacuum transfer unit check valve being biased in a closed configuration thereby isolating the vessel from the vacuum source.

6. A vacuum transfer system for transferring liquid food grade product as claimed in claim 5 wherein the vacuum transfer unit check valve is shifted to an open configuration from the biased closed configuration by the generation of a vacuum acting thereon to overcome the closing bias.

7. A vacuum transfer system for transferring liquid food grade product as claimed in claim 6 wherein the vacuum transfer unit check valve is shifted to an open configuration by the generation of a vacuum acting thereon of less than ten inches of mercury.

8. A vacuum transfer system for transferring liquid food grade product as claimed in claim 7 wherein the vacuum transfer unit check valve is shifted to an open configuration by the generation of a vacuum acting thereon of between three and five inches of mercury.

9. A vacuum transfer system for transferring liquid food grade product as claimed in claim 4 wherein the vacuum transfer unit further includes a backup shutoff valve for selectively interrupting the flow communication with the vacuum source.

10. A vacuum transfer system for transferring liquid food grade product as claimed in claim 9 wherein the vacuum transfer unit backup shutoff valve is selectable between an open and a closed configuration, the backup shutoff valve being selected to the open configuration upon activation of the vacuum source.

11. A vacuum transfer system for transferring liquid food grade product as claimed in claim 10 wherein the vacuum transfer unit backup shutoff valve is a butterfly valve.

12. A vacuum transfer system for transferring liquid food grade product as claimed in claim 4 wherein the vacuum transfer unit further includes a vent valve in flow communication with a fluid for displacing the liquid food grade product contained within the vessel, the vent valve being selectably configured between a closed configuration and an open configuration, the open configuration for admitting displacing fluid to the vessel during transfer of the liquid food grade product from the vessel.

13. A vacuum transfer system for transferring liquid food grade product as claimed in claim 12 wherein the vacuum transfer unit vent valve is a manually operated butterfly valve.

14. A vacuum transfer system for transferring liquid food grade product as claimed in claim 4, the vacuum transfer unit further including:

a ball float valve; and a valve seat, being fluidly coupled to a fluid conduit, whereby the ball float valve is floatable on the liquid food grade product contained within the second vessel and sealingly engages the valve seat responsive to the liquid food grade product rising to a selected level within the vessel, said sealing engagement preventing the liquid food grade product from passing into the fluid conduit.

15. A vacuum transfer system for transferring liquid food grade product as claimed in claim 14, the vacuum transfer unit further including a ball float valve cage having a plurality of apertures defined therein and supporting the ball float valve proximate the valve seat.

16. A vacuum transfer system for transferring liquid food grade product as claimed in claim 4 wherein the vessel is mounted on the chassis of a transportable vehicle.

17. A vacuum transfer unit being operably coupled to a vessel and to a selectively activatable vacuum source and being designed to control the flow of fluid into and out of the vessel, the vessel being adapted to contain a liquid food grade product, the vacuum transfer unit comprising:

three interconnected conduits for the conveyance of fluid, each of said three conduits having at least one valve associated therewith for controlling the flow of fluid therethrough;

a first of the three interconnected conduits being selectively in flow communication with the selectively activatable vacuum source a second of the three interconnected conduits being selectively in flow communication with the atmosphere;

a third of the three interconnected conduits being selectively in flow communication with the vessel; and releasable sealing means for releasably sealing the vacuum transfer unit in an aperture defined in a wall of the vessel.

18. A vacuum transfer unit as claimed in claim 17 wherein the valve associated with a first of the three conduits is a first conduit check valve, the first conduit check valve being biased in a closed configuration to isolate the vessel from a fluid source.

19. A vacuum transfer unit as claimed in claim 18 wherein the first conduit check valve is placed in an open configuration from the biased closed configuration by the generation of a vacuum acting to overcome the closing bias.

20. A vacuum transfer unit as claimed in claim 19 wherein the first conduit check valve is placed in an open configuration by the generation of a vacuum acting thereon of less than ten inches of mercury.

21. A vacuum transfer unit as claimed in claim 20 wherein the first conduit check valve is placed in an open configuration by the generation of a vacuum acting thereon of between three and five inches of mercury.

22. A vacuum transfer unit as claimed in claim 17 further including a backup shutoff valve disposed in the first of the three interconnected conduits for selectively isolating the vessel from a fluid source.

23. A vacuum transfer unit as claimed in claim 22 wherein the backup shutoff valve is a butterfly valve.

24. A vacuum transfer unit as claimed in claim 17 wherein the valve associated with a second of the three conduits is a vent valve being in flow communication with a fluid that is external to the vessel, the vent valve being selectably configured between a closed configuration and an open configuration, the open configuration for admitting the fluid that is external to the vessel to the vessel.

25. A vacuum transfer unit as claimed in claim 24 wherein the second conduit vent valve is a manually operated butterfly valve.

26. A vacuum transfer unit as claimed in claim 17 wherein the valve associated with a third of the three conduits is a ball float valve disposed proximate a valve seat, the valve seat being fluidly coupled to a fluid conduit, whereby the ball float valve floats on the liquid food grade product contained within the second vessel and sealingly engages the valve seat responsive to the liquid food grade product rising to a selected level within the second vessel, said sealing engagement preventing the liquid food grade product from passing into the fluid conduit.

27. A vacuum transfer unit as claimed in claim 26 further including a ball float valve cage having a plurality of apertures defined therein and supporting the ball float valve proximate the valve seat.

28. A vacuum transfer unit as claimed in claim 17 wherein the wherein the vessel is mounted on the chassis of a transportable vehicle.

29. A vehicle for the transportation of liquid food grade product having a chassis supported on a plurality of road engaging wheels and having at least one tank supported on the chassis, the vehicle having a vacuum transfer system for transferring food grade product to and from the at least one tank, the vacuum transfer system comprising:

a selectively activatable vacuum source;

a vacuum transfer unit being in fluid communication with the vacuum source and with the tank and having three interconnected conduits for the conveyance of fluid, each of said three conduits having at least one valve associated therewith for controlling the flow of fluid therethrough, a first of the three interconnected conduits being selectively in flow communication with the selectively activatable vacuum source, a second of the three interconnected conduits being selectively in flow communication with the atmosphere, and a third of the three interconnected conduits being selectively in flow communication with the tank; and valving means operably coupled to the vacuum source and the vacuum transfer unit for selectively pressurizing the tank and drawing a vacuum in the tank, whereby drawing a vacuum by the vacuum source in the tank acts to draw the liquid food grade product into the tank and pressurizing the tank acts to expel the liquid food grade product from the tank.

30. A vehicle for the transportation of liquid food grade product as claimed in claim 29 further including the vacuum transfer unit having a check valve for selectively interrupting the flow communication with the vacuum source, the vacuum transfer unit check valve being biased in a closed configuration thereby fluidly isolating the tank from the vacuum source.

31. A vehicle for the transportation of liquid food grade product as claimed in claim 30 wherein the vacuum transfer unit check valve is shifted to an open configuration from the biased closed configuration by the generation of a vacuum acting thereon to overcome the closing bias.

32. A vehicle for the transportation of liquid food grade product as claimed in claim 31 wherein the vacuum transfer unit check valve is shifted to an open configuration by the generation of a vacuum acting thereon of less than ten inches of mercury.

33. A vehicle for the transportation of liquid food grade product as claimed in claim 32 wherein the vacuum transfer unit check valve is shifted to an open configuration by the generation of a vacuum acting thereon of between three and five inches of mercury.

34. A vehicle for the transportation of liquid food grade product as claimed in claim 33 wherein the vacuum transfer unit further includes a backup shutoff valve for selectively interrupting the flow communication with the vacuum source.

35. A vehicle for the transportation of liquid food grade product as claimed in claim 29 wherein the vacuum transfer unit further includes a vent valve in flow communication with a fluid for displacing the liquid food grade product contained within the vessel, the vent valve being selectably configured between a closed configuration and an open configuration, the open configuration for admitting displacing fluid from the atmosphere to the vessel during transfer of the liquid food grade product from the vessel.

36. A vehicle for the transportation of liquid food grade product as claimed in claim 29 wherein the vacuum transfer system is self contained on the vehicle and capable of both loading and unloading the tank with liquid food grade product.

37. A vehicle for the transportation of liquid food grade product as claimed in claim 29 further including cleansing apparatus fluidly coupled to the tank for introducing a cleaning solution thereto, having a nozzle disposed within the tank for distributing the cleaning solution throughout the tank.

\* \* \* \* \*